United States Patent
Ito et al.

(10) Patent No.: US 6,959,597 B2
(45) Date of Patent: Nov. 1, 2005

(54) TRANSMITTER FOR TIRE STATE MONITORING APPARATUS

(75) Inventors: Yoshitaka Ito, Ogaki (JP); Setsuhiro Saheki, Ogaki (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 0 days.

(21) Appl. No.: 10/612,467

(22) Filed: Jul. 1, 2003

(65) Prior Publication Data

US 2004/0034454 A1    Feb. 19, 2004

(30) Foreign Application Priority Data

Aug. 1, 2002  (JP)  ............................. 2002-224659
Aug. 1, 2002  (JP)  ............................. 2002-224660

(51) Int. Cl.$^7$ ............................................. B60C 23/02
(52) U.S. Cl. ................................... 73/146.8; 73/146.4
(58) Field of Search ............................... 73/146, 146.8, 73/146.2, 146.3, 146.4, 146.5; 340/442, 445

(56) References Cited

U.S. PATENT DOCUMENTS

| | | | |
|---|---|---|---|
| 5,844,131 A | 12/1998 | Gabelmann et al. | ....... 73/146.8 |
| 5,956,820 A | 9/1999 | Albinski | ....................... 24/455 |
| 6,055,855 A | 5/2000 | Straub | ........................ 73/146.8 |
| 6,568,259 B2 * | 5/2003 | Saheki et al. | .................. 73/146 |
| 6,708,558 B2 * | 3/2004 | Saheki | ........................ 73/146.5 |
| 2003/0112137 A1 * | 6/2003 | Saheki | ......................... 340/442 |
| 2004/0119584 A1 * | 6/2004 | Kayukawa | ................... 340/445 |
| 2004/0154389 A1 * | 8/2004 | Okubo et al. | ............... 73/146.4 |

FOREIGN PATENT DOCUMENTS

DE          10047853          2/2000

* cited by examiner

Primary Examiner—Max Noori
Assistant Examiner—Andre Allen
(74) Attorney, Agent, or Firm—Sheridan Ross P.C.

(57) ABSTRACT

A transmitter for a tire state monitoring apparatus that is easily connected to a wheel in an optimal manner. The transmitter includes a valve stem connected to a wheel to which the tire is attached. Electric components are mounted on a circuit board to detect the state of the tire. A casing accommodates the circuit board in the tire. The casing faces toward an outer circumferential surface of the wheel. A connecting portion connects the casing to the valve stem pivotally about a line perpendicular to the axial direction of the valve stem. A pressing mechanism presses the casing toward the outer circumferential surface of the wheel to restrict pivoting of the casing.

21 Claims, 5 Drawing Sheets

TRANSMITTER FOR TIRE STATE MONITORING APPARATUS

BACKGROUND OF THE INVENTION

The present invention relates to a transmitter for a tire state monitoring apparatus, and more particularly, to a transmitter connected to a wheel, to which a tire is attached, to transmit information related with tire air pressure to a receiver arranged in a vehicle.

In recent years, for safety reasons, the employment of a wireless tire monitoring apparatus is becoming popular which checks the state of vehicle tires from inside a vehicle when the vehicle is being driven.

Referring to FIG. 1, a wireless tire state monitoring apparatus includes a transmitter 50 to transmit information related with tire air pressure to a receiver (not shown), which is installed in the passenger compartment. The transmitter 50 includes a box-like casing 51 and a valve stem 52, which extends integrally from the casing 51. The casing 51 accommodates a circuit board (not shown) and a battery (not shown). Pressure detecting devices and circuit devices for processing various signals are mounted on the circuit board. The battery supplies the devices with power. A vent hole (not shown) extends through the casing 51.

As shown in FIG. 2, the transmitter 50 is connected to the wall defining a valve hole 63 of a tire wheel 62 to arrange the casing 51 in a tire 61. Air is charged into the tire 61 from the valve stem 52 and through the vent hole.

To decrease the weight of the transmitter 50, the casing 51 is formed from resin. When the vehicle is being driven, centrifugal force is applied to the transmitter. The centrifugal force varies in accordance with the diameter of the tire wheel 62, the outer diameter of the tire 61, and the velocity of the vehicle. For example, the centrifugal force reaches about 1,500 G at 300 km/h. The centrifugal force acts to deform the casing 51 of the transmitter 50 such that the casing 51 moves away from the tire wheel 62. As a result, in the transmitter 50, when the casing 51, which is formed integrally with the valve stem 52, is deformed regardless of its resiliency, stress is produced in the circuit board accommodated in the casing 51. Such mechanical stress may lead to deficient connections.

Referring to FIG. 2, when the tire 61 is attached to or removed from the tire wheel 62, the bead 61a of the tire 61 passes by the casing 51 of the transmitter 50. As the bead 61a passes by the casing 51, the bead 61a pushes the casing 51 of the transmitter 50 toward the tire wheel 62. When the angle of the axis of the valve hole 63 in the tire wheel 62 relative to the axis of the tire wheel 62 (hereinafter referred to as valve hole angle) is large, the casing 51 is separated from the drop center 62a of the tire wheel 62. In such a case, it is difficult for the bead 61a of the tire 61 to smoothly pass by the casing 51 of the transmitter 50, and the force applied to the casing 51 by the bead 61a increases. This increases the possibility of an abnormality occurring in the circuit board accommodated in the casing 51.

To prevent such problems in the prior art, the transmitter 50 is formed so that the inclination of the casing 51 relative to the axis of the valve stem 52 is greater than the valve hole angle.

However, the valve hole angle is only required to be within a predetermined range (15 degrees to 25 degrees) and the location of the valve hole 63 differs slightly between tire wheels 62. Further, the inclination of the rim 62b relative to the drop center 62a of the tire wheel 62 differs between products depending on the design of the wheel. Thus, the inclination angle of the casing 51 should be fixed for each product to guarantee optimal connection to the wheel 62. However, this would increase the cost for manufacturing the transmitter 50.

SUMMARY OF THE INVENTION

One aspect of the present invention is a transmitter for use in a tire state monitoring apparatus. The transmitter transmits data indicating the state of a vehicle tire mounted on a wheel having an outer circumferential surface. The transmitter includes a valve stem having an axial direction and connectable to the wheel to which the tire mounts and a circuit board on which a plurality of electric components are mounted to detect the state of the tire. A casing accommodates the circuit board in the tire. The casing is positionable facing the outer circumferential surface of the wheel. A connecting portion connects the casing to the valve stem pivotally about a line perpendicular to the axial direction of the valve stem. A pressing mechanism presses the casing toward the outer circumferential surface of the wheel to restrict pivoting of the casing.

Another aspect of the present invention is a transmitter for use in a tire state monitoring apparatus. The transmitter transmits data indicating the state of a vehicle tire mounted on a wheel having an outer circumferential surface. The transmitter includes a valve stem, having an axial direction, connectable to the wheel to which the tire mounts and having an end portion through which a fastener hole extends. The transmitter further includes a circuit board on which a plurality of electric components are mounted to detect the state of the tire. A casing accommodates the circuit board in the tire. The casing is positionable facing toward the outer circumferential surface of the wheel. A connecting portion connects the casing to the valve stem pivotally about a line perpendicular to the axial direction of the valve stem. A fastener fastens the casing to the outer circumferential surface of the wheel to restrict pivoting of the casing. The fastener is inserted through the fastener hole and has a distal portion that contacts the casing.

A further aspect of the present invention is a transmitter for use in a tire state monitoring apparatus. The transmitter transmits data indicating the state of a vehicle tire mounted on a wheel having an outer circumferential surface. The transmitter includes a valve stem connectable to the wheel to which the tire mounts. The valve stem includes an end face and an axial direction. The transmitter further includes a circuit board on which a plurality of electric components are mounted to detect the state of the tire. A casing accommodates the circuit board in the tire. A connecting portion connects the casing to the valve stem pivotally about a line perpendicular to the axial direction of the valve stem. An urging arrangement urges the casing toward the outer circumferential surface of the wheel to restrict pivoting of the casing. The urging arrangement includes a resiliently deformable member having a first end for contacting the casing and a second end for contacting the end face of the valve stem.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
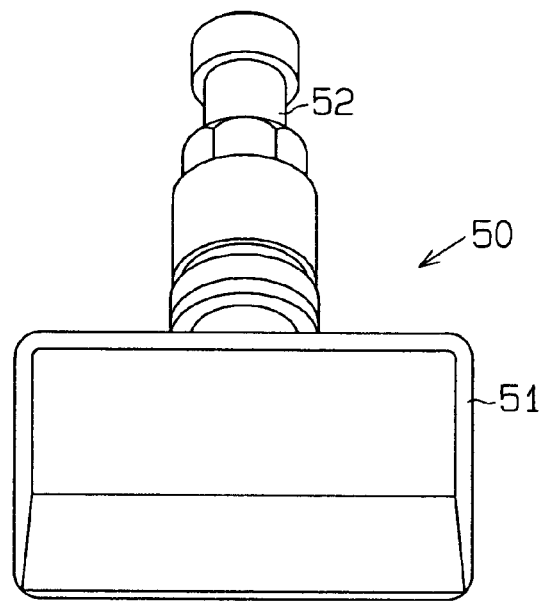
FIG. 1 is a schematic plan view showing a prior art transmitter.
Figure 2:
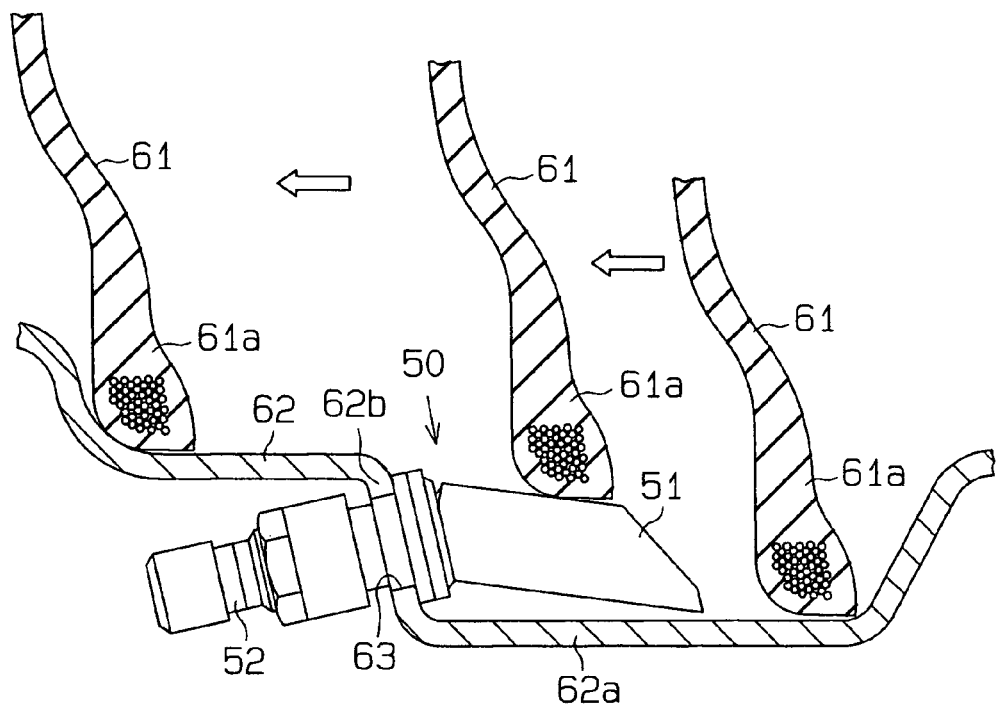
FIG. 2 is a schematic diagram showing the attachment of a tire to a tire wheel in the prior art.

In the drawings, like numerals are used for like elements throughout.

Figure 3:
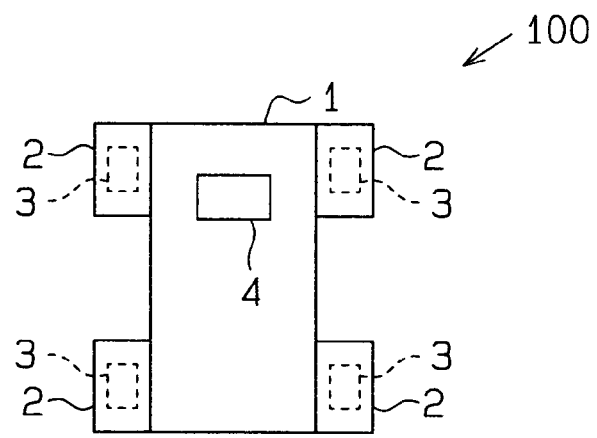
FIG. 3 is a schematic diagram showing a vehicle incorporating a tire state monitoring apparatus according to a first embodiment of the present invention.
Figure 4:
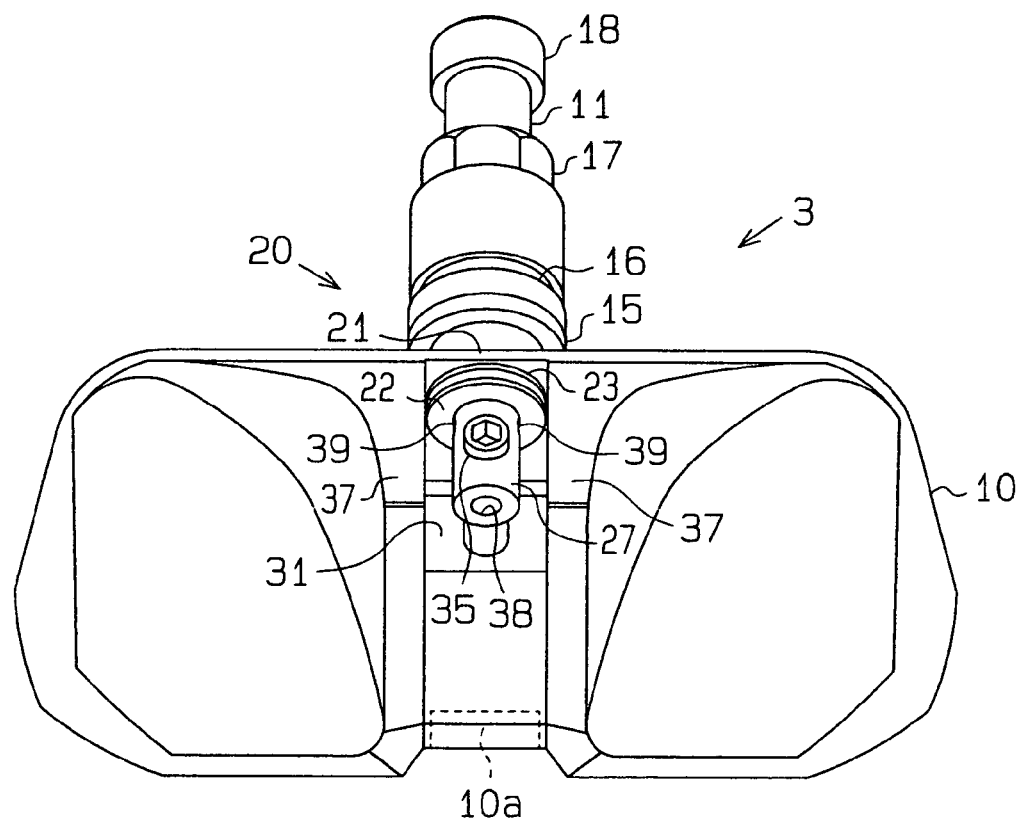
FIG. 4 is a schematic plan view showing a transmitter of the monitoring apparatus of FIG. 3.

FIG. 4 is a schematic plan view showing a transmitter 3 of a tire state monitoring apparatus 100 according to a first embodiment of the present invention. FIG. 3 is a schematic diagram illustrating the tire state monitoring apparatus 100 that includes the transmitter 3.

As shown in FIG. 3, the tire state monitoring apparatus 100 includes four transmitters 3 and a receiver 4. The transmitters 3 are each installed in one of four tire wheels (not shown) to which the tires 2 of a vehicle 1 are attached. The receiver 4 is arranged on the body of the vehicle 1. Each transmitter 3 detects the state of the associated tire 2, that is, the internal air pressure and internal temperature of the tire 2, and transmits data related with the detected internal air pressure and internal temperature to the receiver 4 through a wireless. Based on the received data, the receiver 4 indicates pressure information and temperature information on a display (not shown) arranged in the passenger compartment.

Figure 5:
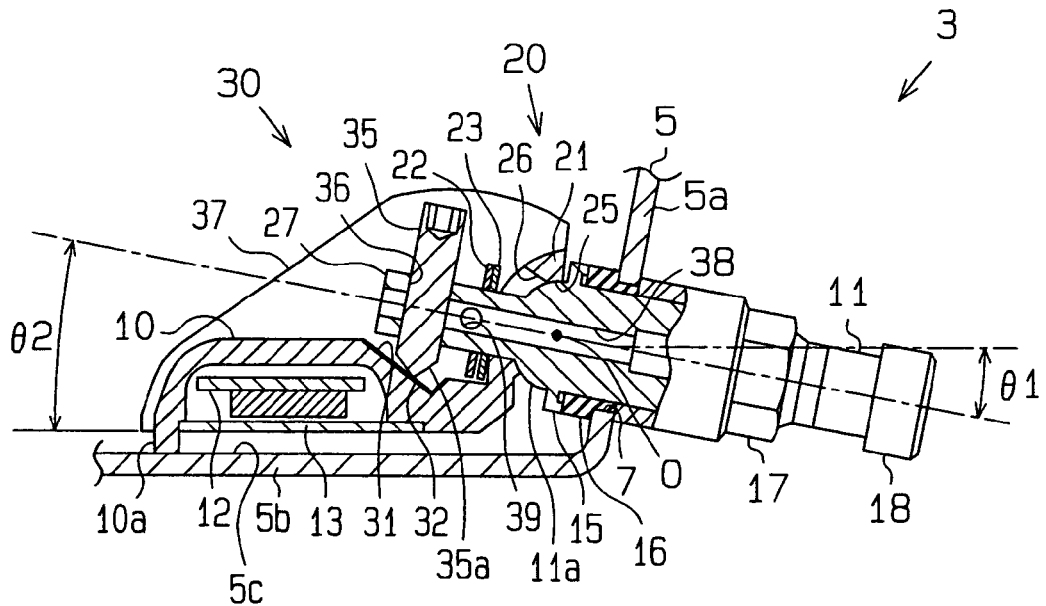
FIGS. 5 and 6 are cross-sectional views showing the transmitter of FIG. 4 in a state connected to a wheel.
Figure 6:
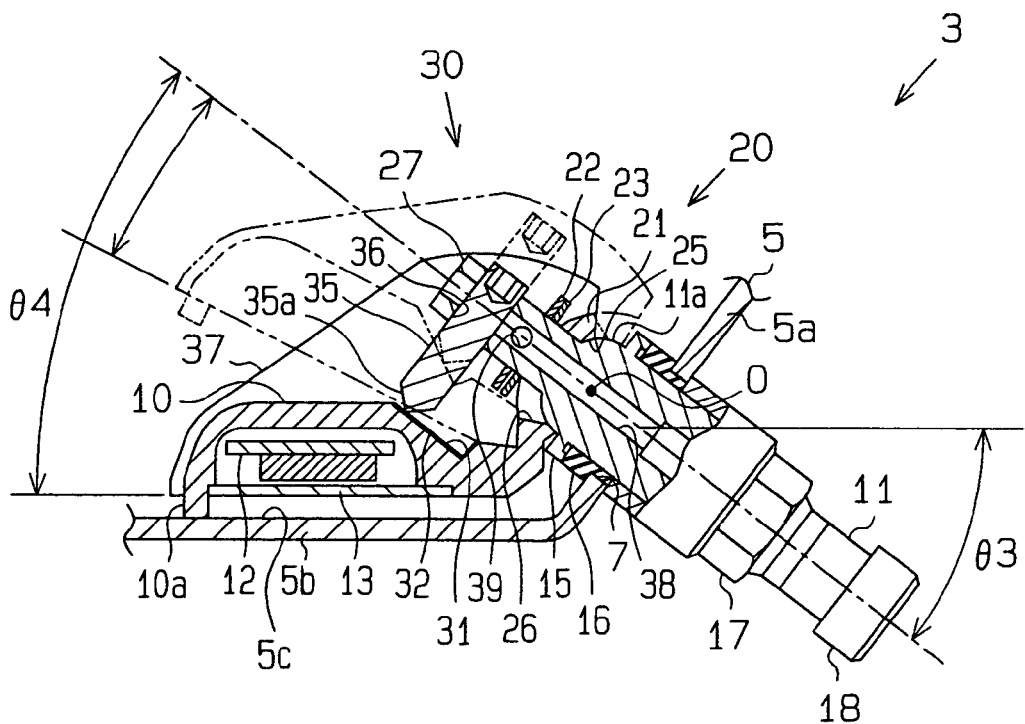

As shown in FIGS. 5 and 6, each transmitter 3 includes a casing 10 and a valve stem 11. The casing 10 is arranged in the associated tire 2. The valve stem 11 is connected to a rim 5a of the wheel 5 through a valve hole 7.

The casing 10 is box-like and made of thermoplastic resin. A circuit board 12 is accommodated in the casing 10. Various electric components, such as a pressure sensor, a temperature sensor, a signal processor, and a battery are mounted on the circuit board 12.

The casing 10 is arranged in the wheel 5 so as to extend along a drop center 5b, which forms part of the circumferential wall of the wheel 5. The casing 10 has a support 10a, which contacts the drop center 5b.

The casing 10 has an opening facing the drop center 5b. The circuit board 12 is arranged in the casing 10 through the opening. A cover 13 closes the opening.

The valve stem 11 extends out of the wheel 5 through the valve hole 7. The valve stem 11 has a basal end on which a flange 15 is formed. A grommet 16 is adhered to the flange 15 on the basal end of the valve stem 11. To improve the adherence of the grommet 16 to the flange 15, the grommet 16 is made of rubber in the first embodiment.

A valve nut 17 is removably fastened to the axially middle portion of the valve stem 11. A valve cap 18, which is made of resin or metal, is removably fastened to the distal end of the valve stem 11. In a state in which the valve cap 18 and the valve nut 17 are removed from the valve stem 11, the valve stem 11 is inserted through the valve hole 7 in the rim 5a from the inner side of the wheel 5. Then, the valve nut 17 is fastened to the valve stem 11 from the outer side of the wheel 5 to connect the valve stem 11 to the wheel 5 in the valve hole 7.

A connecting portion 20 enables adjustment of the angle of the casing 10 relative to the valve stem 11. The connecting portion 20 includes a connecting wall 21, which generally extends in the same direction as the rim 5a on the wheel 5, a slide surface 11a, which is formed on the valve stem 11, a ring 22, which extends from the valve stem 11, and a spring 23.

A seat 25, which has a surface that is smoothly curved in a concave manner, is formed in the connecting wall 21 facing the rim 5a. A pivot hole, or insertion hole 26, which is elongated in the radial direction of the wheel 5, extends through the middle of the seat 25.

The slide surface 11a of the valve stem 11 faces toward the seat 25 of the connecting wall 21 and smoothly curves in a convex manner in correspondence with the concave seat 25. The slide surface 11a is movably received in the seat 25. This enables pivoting of the casing 10 in the longitudinal direction of the insertion hole 26 about a pivot center O, which is the intersection between the axis of the valve stem 11 and the flange 15. In other words, the casing 10 is pivotal about a line perpendicular to the axis of the valve stem 11. Accordingly, the angle formed between the casing 10 and the valve stem 11 (inclination angle) is variable.

A projection 27, which is narrower than other portions of the valve stem 11, extends from the slide surface 11a. The projection 27 in inserted through the insertion hole 26 so that the slide surface 11a is received in the seat 25 of the connecting wall 21.

The ring 22 is fitted to the projection 27, and the spring 23 is located between the ring 22 and the connecting wall 21. The spring 23 urges the ring 22 and the connecting wall 21 away from each other. That is, the casing 10 is connected to the valve stem 11 so that the elastic force of the spring 23 presses the seat 25 of the connecting wall 21 against the slide surface 11a of the valve stem 11.

The width of the insertion hole 26 is about the same as the diameter of the projection 27. This restricts movement of the casing 10 in a direction other than the longitudinal direction of the insertion hole 26. The slide surface 11a and the seat 25 may be curved in a manner restricting rotation of the projection 27 about its axis.

The transmitter 3 includes a positioning portion 30, which fixes the angle between the casing 10 and the valve stem 11. The positioning portion 30 restricts pivoting of the casing 10. The positioning portion 30 includes a sloped surface 31, which is defined on the upper surface of the casing 10, a metal plate 32 arranged on the sloped surface 31, and a bolt 35, which functions as a pressing mechanism and a fastener. The sloped surface 31 is formed in the upper surface of the casing 10 from the middle part of the casing 10 so that the sloped surface 31 becomes lower as the connecting portion 20 becomes closer. In other words, the sloped surface 31 is inclined toward the outer circumferential surface 5c of the wheel 5. The metal plate 32 covers the sloped surface 31.

In the first embodiment, a bolt 35, which has a hexagonal hole, is mated with a fastener hole, or threaded hole 36, which extends through the distal portion of the projection 27. The threaded hole 36 is formed at a position where the distal portion 35a of the bolt 35 would be opposed to the upper surface of the casing 10. When the bolt 35 extends out of the projection 27, the distal portion 35a contacts the sloped surface 31 of the casing 10. This restricts pivoting of the casing 10 and holds the support 10a of the casing 10 in a state pressed against the outer circumferential surface 5c of the drop center 5b. In the first embodiment, the distal portion 35a of the bolt 35 is conical so that the distal portion 35a has an acute cross-section.

The sloped surface 31 is arranged between a pair of protection walls 37. The protection wall 37 is shaped so that the bead of the tire 2 does not get caught in the positioning portion 30.

An air hole 38 extends axially through the valve stem 11. A valve core (not shown) is fitted in the air hole 38. A through hole 39, which is connected with the air hole 38, extends through the projection 27. Air is charged into the tire 2 through the air hole 38 and the through hole 39.

The transmitter 3 of the tire state monitoring apparatus according to the first embodiment of the present invention has the advantages described below.

(1) The projection 27 of the valve stem 11 is inserted in the insertion hole 26, which is elongated in the connecting wall 21 of the casing 10 parallel to the rim 5a. The width of the insertion hole 26 is about the same as the diameter of the projection. The slide surface 11a of the valve stem 11 and the seat 25 of the connecting wall 21 are smoothly curved in a generally identical manner. The casing 10 and the valve stem 11 are connected so that the elastic force of the spring 23 arranged on the projection 27 presses the seat 25 against the slide surface 11a of the valve stem 11. Therefore, by moving the seat 25 along the slide surface 11a, the casing 10 pivots in the longitudinal direction of the insertion hole 26 about the pivot center O. This varies the angle formed between the casing 10 and the valve stem 11.

As a result, the transmitter 3 is connected to the wheel 5 in an optimal state regardless of whether the drop center 5b and the rim 5a are substantially perpendicular to each other as shown in FIG. 5, or the inclination of the rim 5a relative to the drop center 5b is large as shown in FIG. 6.

More specifically, in the wheel 5 of FIG. 5 in which the valve hole angle θ1 is small, the casing 10 is pivoted to decrease the inclination angle θ2 of the casing 10 relative to the valve stem 11. In the wheel 5 of FIG. 6 in which the valve hole angle θ3 is large, the casing 10 is pivoted to increase the inclination angle θ4 of the casing 10 relative to the valve stem 11. By adjusting the inclination angle of the casing 10 relative to the valve stem 11, the transmitter 3 is connected to the wheel 5 in an optimal manner in accordance with the shape of the wheel 5.

(2) The casing 10 is arranged in the wheel 5 along the drop center 5b. Thus, the bead of the tire 2 does not come into contact with the casing 10 when the tire 2 is attached to or removed from the wheel 5. Further, since the casing 10 is in contact with the drop center 5b from the beginning, accidental impacts are avoided even when the bead of the tire 2 presses the casing 10 against the drop center 5b.

(3) The sloped surface 31 of the casing 10 is inclined from the middle of the upper surface of the casing so that it becomes lower as the connecting portion 20 becomes closer. The bolt 35 is inserted through the threaded hole 36, which extends through the distal portion of the projection 27, so that the distal portion 35a of the bolt 35 contacts the sloped surface 31 of the casing 10. The bolt 35 is tightened to press the casing 10 against the drop center 5b and restricts pivoting of the casing 10 toward the rim 5a in addition to fastening the casing, 10 to the drop center 5b.

More specifically, in the wheel 5 of FIG. 1 in which the valve hole angle θ1 is small, the bolt 35 is mated with the threaded hole 36 so that its distal portion 35a slightly extends out of the threaded hole 36 to press and fasten the casing 10 to the outer circumferential surface 5c of the drop center 5b. In the wheel 5 of FIG. 6 in which the valve hole angle θ3 is large, the length of the distal portion 35a that extends out of the threaded hole 36 is increased to press and fasten the casing 10 to the outer circumferential surface 5c of the drop center 5b. In this case, the inclination angle θ4 of the casing 10 relative to the valve stem 11 is large. Thus, the bolt 35 is inclined relative to the casing 10 toward the connecting portion 20. However, the sloped surface 31, which is contacted with the distal portion 35a, is inclined so that it becomes lower as the connecting portion 20 becomes closer. Thus, the distal portion 35a is substantially perpendicular to the sloped surface 31 when contacting the sloped surface 31. When pressing the sloped surface 31 of the distal portion 35a, the distal portion 35a tends to move downward on the sloped surface 31. This applies a force to the sloped surface 31 acting to press the casing 10 toward the drop center 5b.

As a result, the bolt 35 guarantees the casing 10 being fastened to the drop center 5b of the wheel. This prevents centrifugal force, which is produced when the vehicle is being driven, from deforming the casing 10. Thus, the stress that would be applied to the circuit board 12 when the casing 10 is deformed is reduced. Accordingly, the occurrence of abnormalities resulting from mechanical stress is avoided.

(4) The metal plate 32 covers the sloped surface 31. Thus, even if external force is applied to the casing 10 due to centrifugal force or contact with the tire bead, the distal portion 35a of the bolt 35 is not displaced and the sloped surface 31 is not deformed. As a result, the transmitter 3 is constantly held in a fixed state.

(5) The sloped surface 31 is arranged between the two protection walls 37. The protection walls 37 protect the projection 27 of the valve stem 11 and the bolt 35 from contact with the tire bead.

Figure 7:
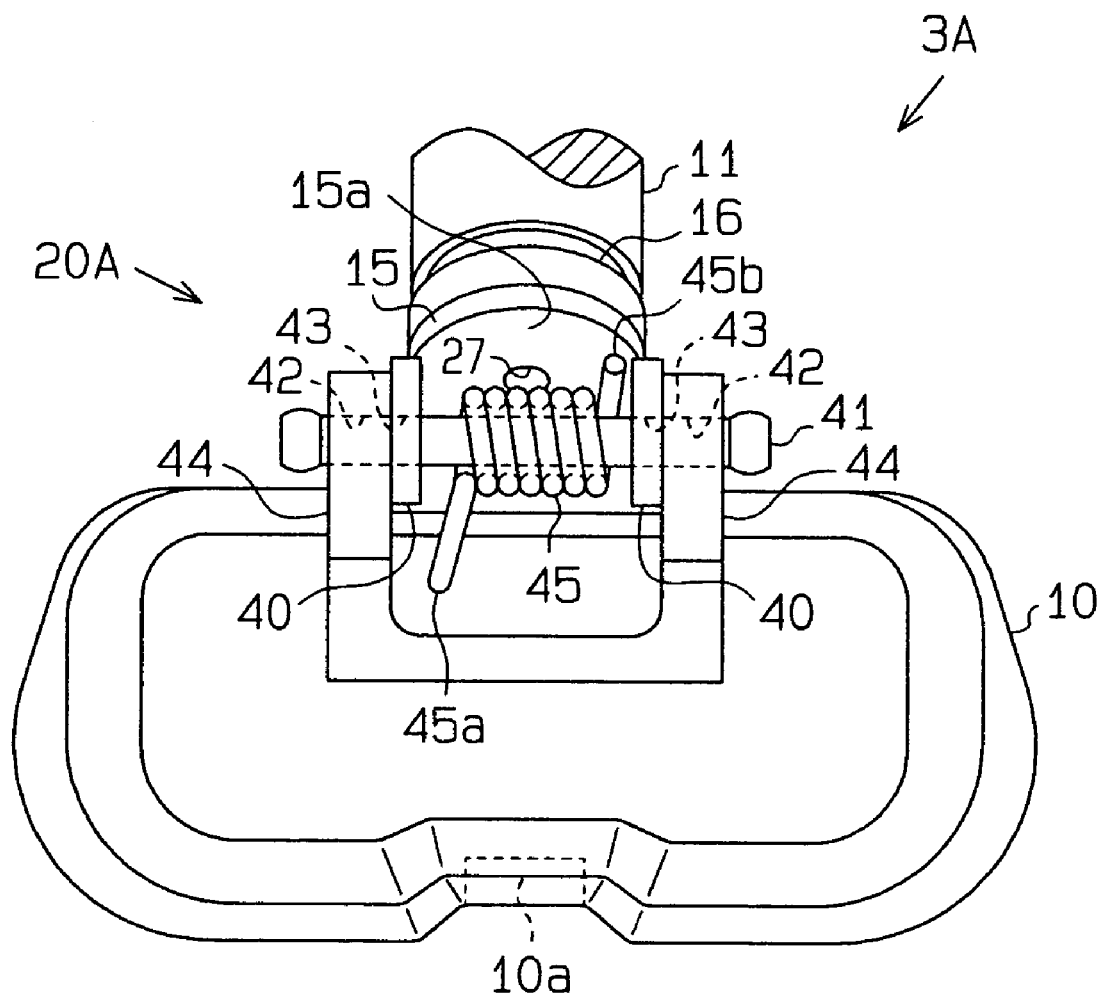
FIG. 7 is a schematic plan view showing a transmitter of a tire state monitoring apparatus according to a second embodiment of the present invention.
Figure 8:
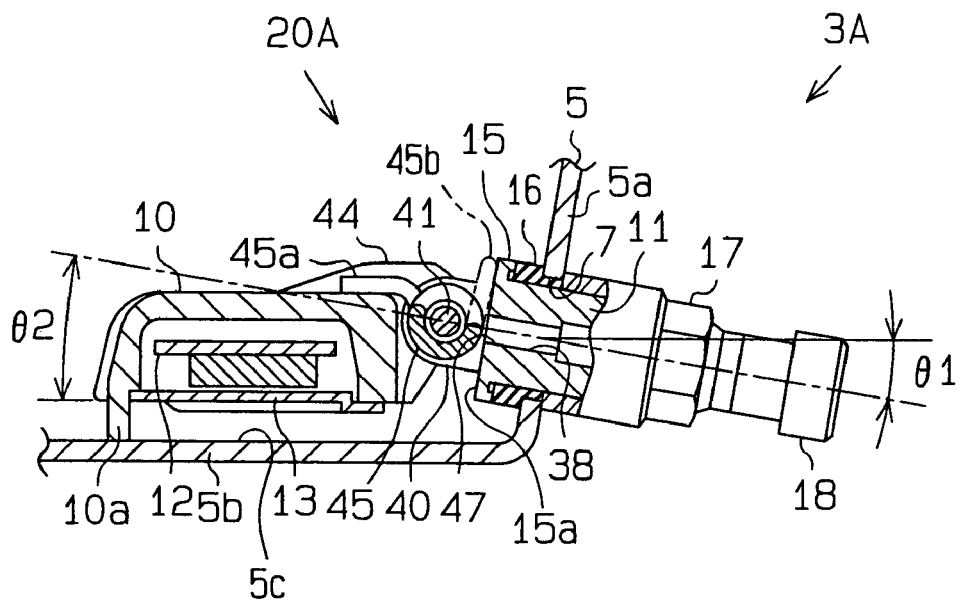
FIGS. 8 and 9 are cross-sectional views showing the transmitter of FIG. 7 in a state connected to a wheel.

FIGS. 7 and 8 show a transmitter 3A of a tire state monitoring apparatus according to a second embodiment of the present invention. The parts of the second embodiment that differ from the first embodiment will now be discussed.

A flange 15 is formed on the end of the valve stem 11 that is closer to the wheel. A flat end face 15a is defined on the flange 15. A vent hole 47 extends through the center of the flat end face 15a. The vent hole 47 is connected with an air hole 38, which extends axially through the valve stem 11. A valve core (not shown) is fitted in the air hole 38. Air is charged into the tire 2 through the air hole 38 and the vent hole 47.

The casing 10 is pivotally connected to the valve stem 11 by means of a connecting portion 20A. Thus, the angle of the casing 10 relative to the valve stem 11 (i.e., inclination of the casing 10) is variable.

The connecting portion 20A of the second embodiment includes a pair of connecting tabs (first connecting members) 40 extending from the flat end face 15a of the valve stem 11, a pair of connecting arms (second connecting members) 44 extending from the upper surface of the casing 10, and a pivot shaft 41.

The connecting arms 44 are flat and extend parallel to each other on the upper surface of the casing 10 toward the rim 5a. A through hole 42 extends through each connecting arm 44. The two through holes 42 are located at opposing positions in the connecting arms 44.

The connecting tabs 40 are flat and arranged on opposite ends of the flat end face 15a of the valve stem 11. The connecting tabs 40 extend parallel to each other on opposite sides of the vent hole 47 in the axial direction of the valve stem 11. A through hole 43 extends through each connecting tab 40. The two through holes 43 are located at opposing positions in the connecting tabs 40.

As shown in FIG. 7, the connecting tabs 40 of the valve stem 11 are arranged between the connecting arms 44. The pivot shaft 41 is inserted through the through holes 42 and 43 to pivotally support the casing 10. The casing 10 is pivoted about the pivot shaft 41 to vary the inclination angle of the casing 10.

In the second embodiment, the distance between the connecting arms 44 and the distance between the outer surfaces of the connecting tabs 40 are about the same. The two ends of the pivot shaft 41 are deformed in a rivet-like manner by external force. This restricts movement of the casing 10 in a direction parallel to the pivot shaft 41.

Figure 9:
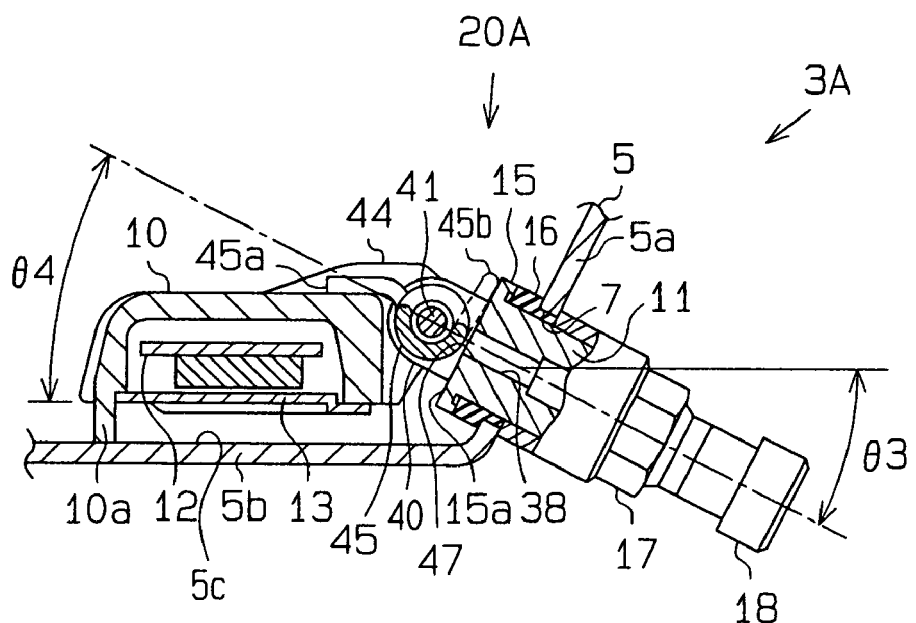

A torsion coil spring 45, which serves as a pressing mechanism and an urging arrangement, is fitted to the pivot shaft 41. The torsion coil spring 45 has a first end 45a that contacts the upper surface of the casing 10 and a second end 45b that contacts the flat end face 15a of the valve stem 11. As shown in FIGS. 8 and 9, the elastic force of the torsion coil spring 45 constantly urges the casing 10 toward the drop center 5b. As a result, the first end 45a of the torsion coil spring 45 presses the support 10a of the casing 10 against the outer circumferential surface 5c of the drop center 5b.

The transmitter 3A of the tire state monitoring apparatus according to the second embodiment of the present invention has the advantages described below.

(1) The pivot shaft 41 is inserted through the through holes 42 formed in the connecting arms 44 and the through holes 43 formed in the connecting tabs 40 of the valve stem 11 to pivotally support the casing 10. The casing 10 pivots about the pivot shaft 41 to adjust the angle between the casing 10 and the valve stem 11 (i.e., inclination angle). As a result, the transmitter 3A is connected to the wheel 5 in an optimal state regardless of whether the drop center 5b and the rim 5a being substantially perpendicular to each other as shown in FIG. 8, or the inclination of the rim 5a relative to the drop center 5b being large as shown in FIG. 9.

More specifically, in the wheel 5 of FIG. 8 in which the valve hole angle θ1 is small, the casing 10 is pivoted to decrease the inclination angle θ2 of the casing 10 relative to the valve stem 11. In the wheel 5 of FIG. 9 in which the valve hole angle θ3 is large, the casing 10 is pivoted to increase the inclination angle θ4 of the casing 10 relative to the valve stem 11. By adjusting the inclination angle of the casing 10 relative to the valve stem 11, the transmitter 3A is connected to the wheel 5 in an optimal manner in accordance with the shape of the wheel 5.

(2) The torsion coil spring 45 is arranged on the pivot shaft 41 so that the first end 45a of the torsion coil spring 45 contacts the upper surface of the casing 10 and the second end 45b of the torsion coil spring 45 contacts the flat end face 15a. The elastic force of the torsion coil spring 45 constantly urges the casing 10 toward the drop center 5b. Thus, the first end 45a of the torsion coil spring 45 presses the support 10a so that the support 10a of the casing 10 contacts the outer circumferential surface 5c of the drop center 5b.

As a result, when the tire 2 is attached to or removed from the wheel 5, the bead of the tire 2 does not contact the casing 10. Further, since the casing 10 is in contact with the drop center 5b from the beginning, accidental impacts are avoided even when the bead of the tire 2 presses the casing 10 against the drop center 5b. In addition, since special procedures do not have to be performed to have the support 10a of the casing 10 come into contact with the outer circumferential surface 5c of the drop center 5b, the transmitter 3A is easily connected to the wheel 5 in an optimal state.

(3) The elastic force of the torsion coil spring 45 presses the casing 10 against the outer circumferential surface 5c of the drop center 5b. When the tire 2 rotates and a centrifugal force greater than the elastic force of the torsion coil spring 45 acts on the casing 10, the casing 10 is lifted away from the drop center 5b toward the rim 5a. This decreases the effect of the wheel 5 when the transmitter 3A transmits data to the receiver 4 and guarantees satisfactory communication.

It should be apparent to those skilled in the art that the present invention may be embodied in many other specific forms without departing from the spirit or scope of the invention. Particularly, it should be understood that the present invention may be embodied in the following forms.

In each of the above embodiments, the application of the transmitters 3 and 3A is not limited to four-wheel vehicles. For example, the transmitters 3 and 3A may be applied to vehicles having two wheels, such as a bicycle or a motorcycle, vehicles having a multiplicity of wheels, such as a bus or a trailer, or industrial vehicles having wheels, such as a forklift truck. When the transmitters 3 and 3A are applied to a trailer, the receiver 4 is installed in a tractor.

In the first embodiment, a curved surface may be formed on the upper surface of the casing 10 in lieu of the sloped surface 31. In such a case, the curved surface may be formed so that the distal portion 35a of the bolt 35 is always perpendicular to the curved surface.

In the first embodiment, a through hole may be formed in the projection 27 in lieu of the threaded hole 36, and a pressing member may be inserted through the through hole. An elastic member may be used as the pressing member so that the distal end of the pressing member is projected toward the casing 10. In such a case, the elastic force of the elastic member presses the casing 10 toward the drop center 5b. Thus, adjustment of the force applied to the casing 10 with a bolt is not required. This easily keeps the transmitter connected to the wheel in an optimal state. Further, when the tire 2 rotates and a centrifugal force greater than the elastic force acts on the casing 10, the casing 10 moves away from the drop center Sb. This decreases the effect of the wheel 5 when the transmitter 3 transmits data to the receiver 4 and guarantees satisfactory communication.

In the first embodiment, a screw or normal bolt may be used in lieu of the bolt 35.

In the first embodiment, the bolt 35 does not necessarily have to be inserted through the projection 27. As long as the distance between the projection 27 and the sloped surface 31 can be adjusted, the bolt 35 may be incorporated in the projection 27 or attached to the projection 27.

In the first embodiment, instead of using the insertion hole 26, the ring 22, and the spring 23 as the connecting portion 20, two plates arranged on opposite sides of the projection 27 may be used as the connecting portion 20. In such a case, the casing 10 is pivotally supported relative to the valve stem 11 by a pivot shaft that extends through the connecting portion 20 and the projection 27.

In the first embodiment, the metal plate 32 covering the sloped surface 31 may be eliminated.

In the second embodiment, the two ends of the pivot shaft 41 may be fastened by nuts.

In the second embodiment, instead of the torsion coil spring 45, other resiliently deformable members, such as a plate spring, may be used.

The present examples and embodiments are to be considered as illustrative and not restrictive, and the invention is not to be limited to the details given herein, but may be modified within the scope and equivalence of the appended claims.

What is claimed is:

1. A transmitter for use in a tire state monitoring apparatus, wherein the transmitter transmits data indicating the state of a vehicle tire mounted on a wheel having an outer circumferential surface, the transmitter comprising:
   a valve stem having an axial direction and connectable to the wheel to which the tire mounts;
   a circuit board on which a plurality of electric components are mounted to detect the state of the tire;
   a casing for accommodating the circuit board in the tire, wherein the casing is positionable facing the outer circumferential surface of the wheel;
   a connecting portion for connecting the casing to the valve stem pivotally about a line perpendicular to the axial direction of the valve stem; and
   a pressing mechanism for pressing the casing toward the outer circumferential surface of the wheel to restrict pivoting of the casing.

2. The transmitter according to claim 1, wherein the casing includes an end portion, and the connecting portion includes:
   a seat having a middle portion, the seat being formed on the end portion of the casing to receive the valve stem;
   a pivot hole extending through the middle portion of the seat to enable pivoting of the casing; and
   a slide surface formed on the valve stem and movably received by the seat.

3. The transmitter according to claim 1, wherein the valve stem includes a projection inserted through the pivot hole, the pressing mechanism being arranged in the projection to press the casing and restrict pivoting of the casing toward the valve stem.

4. The transmitter according to claim 3, wherein the projection includes a through hole, and the pressing mechanism includes a distal portion inserted through the through hole to contact the casing.

5. The transmitter according to claim 4, wherein the pressing mechanism extends out of the valve stem over a length that is adjustable.

6. The transmitter according to claim 5, wherein the through hole and the pressing mechanism are threaded to mate the pressing mechanism and the through hole with each other.

7. The transmitter according to claim 6, wherein the pressing mechanism comprises a bolt for fastening the casing to the outer circumferential surface of the wheel.

8. The transmitter according to claim 3, wherein the projection includes a diameter and the pivot hole is an elongated hole having a width that is substantially the same as the diameter of the projection.

9. The transmitter according to claim 1, wherein the casing has a sloped surface contacted by the pressing mechanism.

10. The transmitter according to claim 9, wherein the sloped surface is inclined relative to the outer circumferential surface of the wheel when the casing is pressed toward the outer circumferential surface of the wheel.

11. The transmitter according to claim 9, wherein the sloped surface is covered by metal.

12. The transmitter according to claim 1, wherein the valve stem includes an end face, and the connecting portion includes:
   two parallel first connecting members arranged on the end face of the valve stem, each of the first connecting members having a first through hole;
   two parallel second connecting members arranged on the casing, each of the second connecting members having a second through hole; and
   a pivot shaft inserted through the first and second through holes to pivotally support the casing.

13. The transmitter according to claim 12, wherein the pressing mechanism includes a resiliently deformable member arranged on the pivot shaft to urge the casing toward the outer circumferential surface of the wheel.

14. The transmitter according to claim 13, wherein the resiliently deformable member is fitted to the pivot shaft and has a first end for contacting the casing and a second end for contacting the end face of the valve stem.

15. The transmitter according to claim 14, wherein the pivot shaft has a first end portion and a second end portion that are rivet-like to restrict movement of the casing in the axial direction of the pivot shaft.

16. A transmitter for use in a tire state monitoring apparatus, wherein the transmitter transmits data indicating the state of a vehicle tire mounted on a wheel having an outer circumferential surface, the transmitter comprising:
   a valve stem, having an axial direction, connectable to the wheel to which the tire mounts and having an end portion through which a fastener hole extends;
   a circuit board on which a plurality of electric components are mounted to detect the state of the tire;
   a casing for accommodating the circuit board in the tire, wherein the casing is positionable facing toward the outer circumferential surface of the wheel;
   a connecting portion for connecting the casing to the valve stem pivotally about a line perpendicular to the axial direction of the valve stem; and
   a fastener for fastening the casing to the outer circumferential surface of the wheel to restrict pivoting of the casing, wherein the fastener is inserted through the fastener hole and has a distal portion that contacts the casing.

17. The transmitter according to claim 16, wherein the casing includes an end portion and the connecting portion includes:
   a seat having a middle portion, the seat being formed on the end portion of the casing to receive the valve stem;
   a pivot hole extending through the middle portion of the seat to enable pivoting of the casing; and
   a slide surface formed on the valve stem and movably received by the seat.

18. The transmitter according to claim 17, wherein the fastener comprises a bolt.

19. A transmitter for use in a tire state monitoring apparatus, wherein the transmitter transmits data indicating the state of a vehicle tire mounted on a wheel having an outer circumferential surface, the transmitter comprising:
   a valve stem connectable to the wheel to which the tire mounts, the valve stem including an end face and an axial direction;
   a circuit board on which a plurality of electric components are mounted to detect the state of the tire;
   a casing for accommodating the circuit board in the tire;
   a connecting portion for connecting the casing to the valve stem pivotally about a line perpendicular to the axial direction of the valve stem; and
   an urging arrangement for urging the casing toward the outer circumferential surface of the wheel to restrict pivoting of the casing, wherein the urging arrangement includes a resiliently deformable member having a first end for contacting the casing and a second end for contacting the end face of the valve stem.

20. The transmitter according to claim 19, wherein the connecting portion includes:
two parallel first connecting members arranged on the end face of the valve stem, each of the first connecting members having a first through hole;
two parallel second connecting members arranged on the casing, each of the second connecting members having a second through hole; and
a pivot shaft inserted through the first and second through holes to pivotally support the casing, wherein the resiliently deformable member is fitted to the pivot shaft.

21. The transmitter according to claim 20, wherein the resiliently deformable member is a torsion coil spring.

* * * * *